US006665420B1

(12) United States Patent
Xie et al.

(10) Patent No.: US 6,665,420 B1
(45) Date of Patent: Dec. 16, 2003

(54) MESSAGE AUTHENTICATION CODE WITH IMPROVED ERROR TOLERANCE

(75) Inventors: Liehua Xie, Newark, DE (US); Arianne M. Lewis, Chestnut Hill, MA (US); Evert Basch, Stow, MA (US); Gonzalo Arce, Wilmington, DE (US)

(73) Assignee: Verizon Laboratories Inc., Waltham, MA (US)

( * ) Notice: Subject to any disclaimer, the term of this patent is extended or adjusted under 35 U.S.C. 154(b) by 681 days.

(21) Appl. No.: 09/596,815

(22) Filed: Jun. 19, 2000

Related U.S. Application Data

(63) Continuation-in-part of application No. 09/453,145, filed on Dec. 2, 1999, and a continuation-in-part of application No. 09/453,333, filed on Dec. 2, 1999.

(51) Int. Cl.[7] .............................. G06K 9/00; G09C 3/00; H04L 9/00
(52) U.S. Cl. ....................... 382/100; 382/232; 713/176; 380/54
(58) Field of Search ................................. 382/100, 232, 382/248, 252, 309; 380/51, 54; 713/176

(56) References Cited

U.S. PATENT DOCUMENTS 5,875,249 A * 2/1999 Mintzer et al. ............... 380/54
6,065,119 A * 5/2000 Sandford et al. ........... 713/200
6,512,836 B1 * 1/2003 Xie et al. ................... 382/100
6,546,113 B1 * 4/2003 Lucas et al. ................ 382/100

OTHER PUBLICATIONS

L. Xie et al., Secure MPEG Video Communication by Watermarking, Proceedings of the 3rd Annual FEDLAB Symposium, Feb. 1999, pp. 459–463.
J. Russ, The Image Processing Handbook, CRC Press, 1995, pp. 216–224.

* cited by examiner

Primary Examiner—Bhavesh M. Mehta
Assistant Examiner—Aaron Carter
(74) Attorney, Agent, or Firm—Leonard Charles Suchyta; James K. Weixel

(57) ABSTRACT

A method of generating a authentication code ("MAC") with improved error tolerance exhibits improved survivability against acceptable signal distortions such as recompression. A method of generating a message authentication code associated with an image includes receiving blocks of image coefficient data where each coefficient has an original value falling within a range of values. The range of values is divided into first and second regions both having allowed coefficient values, and an error tolerance buffer region formed between the first and second regions having disallowed coefficient values. The original values of DC coefficients from each block of the image coefficient data is mapped to a modified value contained in one of the first and second regions, but not contained in the error tolerance buffer region. A MAC is generated as a function of the most significant bits of the modified image coefficient values.

31 Claims, 6 Drawing Sheets

MESSAGE AUTHENTICATION CODE WITH IMPROVED ERROR TOLERANCE

RELATED APPLICATIONS

This application is a continuation-in-part of copending U.S. Ser. No. 09/453,145 filed Dec. 2, 1999, and Ser. No. 09/453,333 filed Dec. 2, 1999, both hereby incorporated by reference in their entireties.

STATEMENT REGRADING FEDERALLY SPONSORED RESEARCH OR DEVELOPMENT

This invention was made with Government support under Contract No. DAAL-01-96-2-0002, awarded by the U.S. Army Research Laboratory. The Government has certain rights in this invention.

BACKGROUND OF THE INVENTION

1. Field of the Invention

This application relates to the field of digital multimedia and more particularly to the field of watermarking digital video content.

2. Description of Related Art

The secure transmission of digital multimedia information is an important concern for multimedia content owners, particularly in distribution channels having public access, such as the Internet or wireless networks. One form of protection has been provided, traditionally, through encryption. However, for widespread distribution of the information, key-management for the encryption is cumbersome. Furthermore, encryption provides incomplete security since, after decryption, the original digital content may be readily reproduced and distributed.

Another form of protection is provided by a message authentication code ("MAC") that is attached to digital content. For example, origination information can appear within a message field appended to digital content. However, this type of add-on authentication is easily identified and removed. In addition, if the communication channel is lossy, conventional cryptographic methods can be inadequate. For example, a single bit error can cause the received signal to fail an authentication check.

A more resilient MAC system is provided by digital watermarking. Digital watermarking is a technique for hiding an identification of origin in a digital media stream. A watermark is actually embedded in the media stream, so that removal of the watermark may destroy or visibly alter the underlying content. The watermark may also be inserted into the original data in a manner that is imperceptible to the listener/viewer. When such watermarked digital content is distributed on-line, or recorded on a disk, the origination data travels with it, and allows the originator to demonstrate the source of the content. Digital watermarking also identifies tampering, since any manipulation of the content will result in an invalid watermark.

There are several characteristics that define useful watermarks. One characteristic is that they be survivable to compression and common signal distortions that may occur during transit. If the watermark survives, it is difficult for the recipient to remove the watermark without destroying the content that it protects. Such a feature is important in protecting copyright rights. Another characteristic is that the watermark describe the content. For example, watermarking can be used to authenticate and tamper-proof multimedia content. For such a use, the watermark must still exhibit survivability (i.e., be robust to compression, common signal distortions, and the effects of error-prone transmission channels), but must also indicate whether any modifications were made to the content itself. Accordingly, the watermark should describe the content and the salient features of the video information. Known approaches for constructing video authentication MACs involve using edge maps or image histograms of the video frames.

Regarding the survivability characteristic of watermarks, for ownership-authentication applications such as for copyright protection, the list of video signal distortions that the MAC must survive is quite extensive, because the content owner is interested in claiming ownership regardless of the manipulation done to the original content. For example, such MACs must be robust to (i.e., survive) cropping, rotating, dithering, and recompression and the like. The list of acceptable distortions for authentication/tamper-proofing purposes is more limited, because the authentication MAC must still be able to identify tampering. Distortions caused by recompression or minor channel errors do not indicate tampering, while cropping, rotating and the like do. During recompression, the essence of the video information is maintained, but minor fluctuations in individual coefficient values, though perhaps not perceptible, can change the value of the MAC. For authentication, determining what distortions are acceptable and which constitute tampering is difficult.

There is therefore a need for a system and method for generating a message authentication code (MAC) that minimizes or eliminates one or more of the problems set forth above.

SUMMARY OF THE INVENTION

One object of the present invention is to provide a message authentication code that is robust to predefined signal distortions (e.g., at a level expected due to normal recompression, etc.).

Another object of the present invention is to provide a message authentication code that compactly describes digital video content in a manner that permits tamper-proofing and authentication of origin.

It is yet another object of the present invention to provide a message authentication code that permits identification of particular areas within an image that have been subjected to tampering.

To achieve these and other objects, a system and method of generating a message authentication code (MAC) is provided. One advantage of the present invention is that it provides a MAC having a built-in tolerance to expected signal distortions. In particular, the invention provides for an error tolerance buffer that is based on an amount of acceptable distortion that the video information is expected to incur during recompression, etc. Minor modifications in coefficients associated with the content that fall within the accepted error tolerance range will not cause a change in the MAC. Modifications above the given threshold, whether due to excessive recompression, or actual tampering, will alter the MAC and will indicate tampering in a receiver.

In accordance with the present invention, a method for generating a MAC associated with an image includes four basic steps. The first step involves receiving a plurality of blocks of image coefficient data, each coefficient having an original value in a range of values. The second step involves defining an error tolerance buffer by dividing the range of values into first and second regions and a buffer region therebetween. The first and second regions have allowed coefficient values while the buffer region contains disallowed coefficient values. The next step involves mapping an original value of at least one coefficient from each block to a respective modified value falling within one of the first and second regions, but not the buffer region (disallowed coefficients). The last basic step involves generating the MAC according to predetermined strategy as a function of the most significant bit (MSB) of the image coefficient values.

In a preferred embodiment, a DC coefficient from each block is mapped. The MSBs of low frequency (e.g., DC) coefficients are most likely to survive minor distortions such as recompression. Preferably, the predetermined strategy comprises any algorithm for producing a MAC that uses the MSBs of the DC coefficients. However, MACs based on the MSBs of DC coefficients are vulnerable, at least in one respect, to being lost, even though the essence of the low frequency information is maintained during recompression or the like. For example, for coefficients that range from 0 to 255, the coefficients 128 and 127 are close in value even though their bit representations differ in every bit. A small change in the value of a coefficient (e.g., from 127•128, due to recompression) could result in the MSB of a coefficient changing (e.g., MSB=0•MSB=1). The error tolerance buffer specifies disallowed coefficient values—ones that are vulnerable to minor distortions that would change their MSB and thus alter the MAC. All coefficients are mapped, but any coefficients in the buffer region are moved away to either the first region or the second region. After mapping, the modified coefficients all have at least a minimum predefined amount of "distance" to an MSB crossover threshold. For example, for an 8-bit coefficient, the crossover occurs between 127 and 128. For a 10-bit coefficient, between 511 and 512. So long as any change to the image coefficients is less than the minimum "distance", the MAC will remain unchanged—otherwise the MAC will change and tampering will be indicated.

Other features, object and advantages of the present invention will become apparent to one skilled in the art from the following detailed description and accompanying drawings illustrating features of the invention by way of example, but not by way of limitation.

DETAILED DESCRIPTION OF THE PREFERRED EMBODIMENTS

Figure 1:
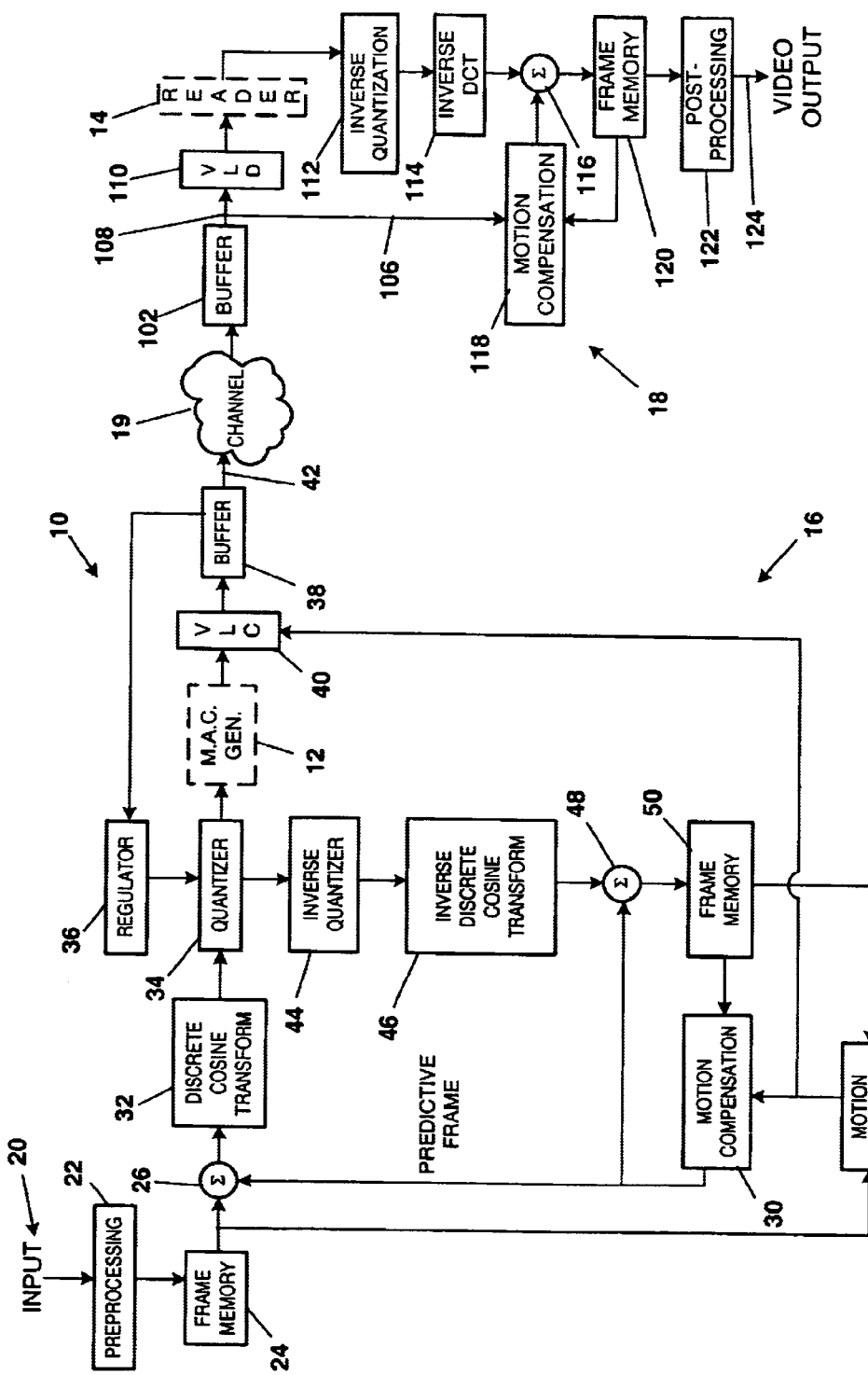
FIG. 1 is a simplified block diagram view of a system in accordance with the present invention.

Referring now to the drawings wherein like reference numerals are used to identify identical components in the various views, FIG. 1 is a simplified block diagram of an exemplary Moving Picture Experts Group (MPEG) system 10. FIG. 1 also shows a message authentication code (MAC) generator and watermark unit 12 and a MAC reader 14, both in accordance with the present invention. System 10 includes an encoder 16, and a decoder 18 separated by a channel 19.

In the illustrated embodiment, MPEG system 10, other than for MAC generator 12 and reader 14, may comprise known, well-understood blocks adapted for the encoding, transmission, and decoding of an MPEG-2 video stream. It should be appreciated that the methods and systems described herein can be suitably adapted to any system for coding digital multimedia including digital versatile disk, compact disk video, personal computer video, streaming Internet video, digital cable television, and digital satellite television. As used herein, the term "multimedia" refers to any medium or combination of media, such as still video, motion video, audio, and the like. The methods and systems described herein are particularly applicable to those coding schemes based on frequency-transformed image data including MPEG-1, MPEG-2, MPEG-4, and known teleconferencing standards. As used herein, the term "MPEG" is specifically intended to refer to the MPEG-2 video standard, as well as the MPEG-1 and MPEG-4 standards. Further, as used herein, the term "watermark" refers to any digital sequence embedded into a digital media stream, and the term "message authentication code" refers to a particular digital sequence indicative of digital media origin, such as the histogram watermark or other watermark, preferably determined using a most significant bit (MSB) of an image coefficient value. A message authentication code ("MAC") may be embedded into a digital media stream as a watermark.

With continued reference to FIG. 1, encoder 16 is configured to convert input video into a compressed digital video output stream. The digital video stream includes a watermark based on a MAC generated according to the present invention. A video input signal 20 is received by a pre-processing unit 22. The pre-processing unit 22 performs functions required to convert the video input 20 into a form amenable to MPEG encoding. In particular, the pre-processing unit 22 digitizes the video input 20 with an analog/digital converter (if the input 20 is analog) and divides the digitized video into sixteen-by-sixteen pixel squares or macroblocks. The pre-processing unit 22 then converts each digitized macroblock into a luminance-chrominance representation such as YCbCr. A macroblock encoded using a conventional 4:2:0 format for luminance-chrominance has four luminance blocks ($Y_1$–$Y_4$) and two chrominance blocks ($C_b$, $C_r$). Other formats, such as 4:2:2, may also be used. Some sources for video input 20 will already be in a suitable YCbCr format.

Pre-processed macroblocks are stored in a first frame memory 24 where they may be sequentially fed to a first pixel-by-pixel summing junction 26. The macroblocks are also fed to a motion estimation unit 28 for comparison to reconstructed previous images. The summing junction 26 receives predictive or differential image data from a motion compensation unit 30. Here, MPEG compression is improved by allowing the system to operate on a difference image between a current image and an earlier image. A difference image (the complete current image, when encoding an I frame) is provided from the summing junction 26 to a discrete cosine transform ("DCT") unit 32, which performs a two-dimensional DCT on the difference image to provide a transformed block. While the MPEG standard specifies a particular DCT, it will be appreciated that other types of DCT and other transforms are known and may be usefully employed in accordance with the teachings herein.

The transformed block is provided from the DCT unit 32 to a quantizer 34 where each block is quantized using an eight-by-eight quantization index to provide a quantized block. Using this technique, each value in the transformed block is scaled by a corresponding value in the quantization index, thus allowing independent scaling for each spatial frequency in the quantized block. The quantization index may vary depending on whether a block is an I, P, or B block, as well understood by those skilled in the art. A regulator 36 monitors a buffer 38 to prevent overflow of the capacity of the buffer 38. In order to prevent overflow, the regulator 36 may modify the quantization index to achieve greater data compression in the quantizer 34 (at the expense of image quality).

The output of the quantizer is provided to MAC generator and watermark unit 12, which generates a MAC, and etches a watermark (using the MAC) in the coefficients of the image data. The data containing the embedded watermark is fed to a coder 40.

A variable-length coder ("VLC") 40 achieves further compression of an output stream by re-arranging the values in the quantized block and truncating extended runs of zeros. The VLC 40 provides a variable-length coded output to the buffer 38.

Encoder 16 thus produces a compressed video output 42 from the video input 20, which, using MAC generator 12, includes an etched watermark.

In the illustrated embodiment, the output from the quantizer 34 is also fed back to achieve greater compression through differential imaging. The quantizer 34 output is provided to an inverse quantizer which de-quantizes each block. An inverse DCT unit 46 transforms each de-quantized block from the spatial-frequency domain back into the spatial domain to provide a reverse-transformed block. Any differential data from the motion compensation unit 30 is added to the reverse-transformed block in a second pixel-by-pixel summing junction 48, thereby generating a reconstructed block that is stored in a second frame memory 50. It is noted that each reconstructed block is identical to a corresponding block generated by an MPEG decoder that receives the compressed video output 42.

Each reconstructed block from the second frame memory 50 is compared to the sixteen-by-sixteen macroblocks of the next image in the first frame memory 24 in the motion estimation unit 28. The motion estimation unit 28 then generates motion vectors describing where in the next image any macroblocks from the previous image appear. The motion compensation unit 30 uses these motion vectors to generate differential image data. The motion vectors are also forwarded to the variable length coder 40 for transmission as a part of the compressed video output 42. The MPEG decoder 18 receiving the motion vectors can use them, along with the differential image data, to reconstruct a complete image.

With continued reference to FIG. 1, MPEG decoder 18 includes a buffer 102 to receive and buffer an incoming digital bit stream 104, including a compressed video stream such as the compressed video output 42 from MPEG encoder 16. The incoming bit stream 104 includes a watermark embedded therein based on a robust MAC generated in accordance with the invention. The buffer 102 divides the incoming digital bit stream 104 into motion vectors 106 and compressed frames 108 of image data. A variable-length decoder ("VLD") 110 decodes the compressed frames 108 into blocks.

The blocks are provided to MAC reader 14, which extracts the embedded watermark, independently generates a MAC from the image data blocks and compares the two. This functionality will be described in detail below.

The blocks are thereafter provided to an inverse quantization unit 112 that re-scales the blocks using the same quantization index used by the quantizer 34. These re-scaled blocks are then provided to an inverse DCT unit 114 where an inverse DCT is performed on the re-scaled blocks to transform the spatial frequency domain blocks back to the spatial domain, thereby providing spatial domain blocks.

The spatial domain blocks are then provided to a pixel-by-pixel summing junction 116 where motion compensation data from a motion compensation unit 118 is added to provide reconstructed blocks to a frame memory 120. The reconstructed blocks are then provided to a post-processing unit 122, where they are converted into a form for video output 124, which may be accomplished by a digital/analog converter for analog output. For some applications digital output is appropriate, such as a digital display, or a computer memory, disk drive, or other digital storage device. The frame memory 120 buffers consecutive reconstructed blocks. These buffered blocks are fed back to the motion compensation unit 118, where they are used in conjunction with the motion vectors 106 to generate differential image data. In the case of an I block, which encodes all image data, there is no differential image data.

Figure 2:
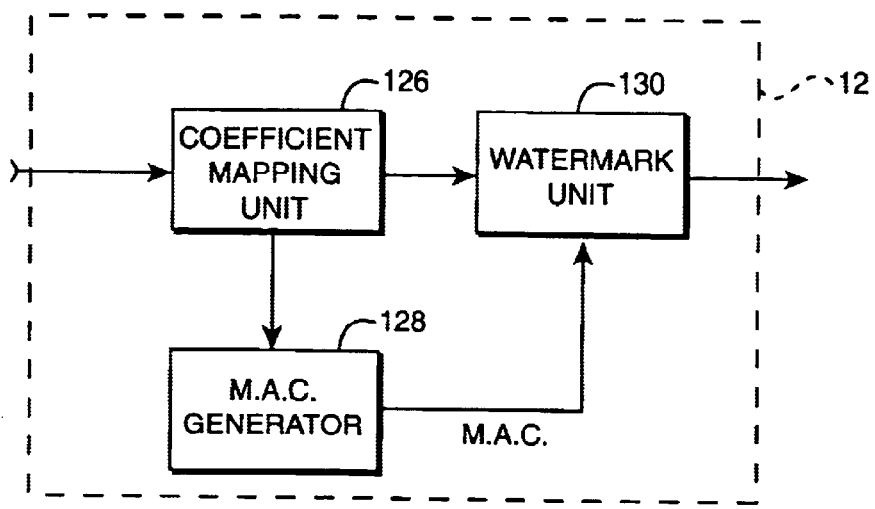
FIG. 2 is a simplified block diagram view showing, in greater detail, a message authentication code (MAC) generator and watermark unit at an encoder end.

FIG. 2 shows, in greater detail, the MAC generator and watermark unit 12 of FIG. 1. Unit 12 includes a coefficient mapping unit 126, a first MAC generator unit 128, and a watermark unit 130.

Coefficient mapping unit 126 receives a plurality of blocks of image coefficient data (preferably quantized). Each coefficient has an original value selected from a range of values. In one embodiment, the range of values is defined by an 8-bit digital word (i.e., 0–255). The coefficient mapping unit 126 is configured to map an original value of at least one coefficient from each block of image coefficient data to a respective modified value. As described in greater detail below, none of the modified values are located in a gap (e.g., an error tolerance buffer) defined around an MSB crossover threshold where a most significant bit (MSB) of a coefficient changes between a 0 and a 1.

First MAC generator unit 128 generates a message authentication code according to a predetermined strategy as a function of the most significant bits (MSBs) of the image coefficient values. As described in the Background, two important characteristics of a useful MAC are: (i) that it describes the salient features of the video sequence in a reasonable amount of information, and (ii) that it is likely to survive minor distortions such as recompression. For images and video, the most dominant characteristic is the low frequency component. Moreover, the most significant bits of the low frequency coefficients are most likely to survive such minor distortions like recompression, etc. Accordingly, MAC generator 128 employs any one of a plurality of known predetermined strategies for generating the MAC as a function of the most significant bit of the image coefficient values. One predetermined strategy involves a counting approach, in combination with a parity bit generation step, as will be described in greater detail in connection with FIGS. 6A–6D. However, other strategies are known to those of ordinary skill in the art, and are specifically contemplated by the present invention, such as various histogram approaches.

Watermark unit 130 is configured to etch the MAC into the MPEG video stream comprising the modified coefficient values from mapping unit 126. Any known watermark unit performing this function may be employed in the present invention, including, for example, the watermark unit disclosed and claimed in copending U.S. application Ser. No. 09/453,333 entitled "DIGITAL WATERMARKING" assigned to the common assignee of the present invention.

Figure 3:
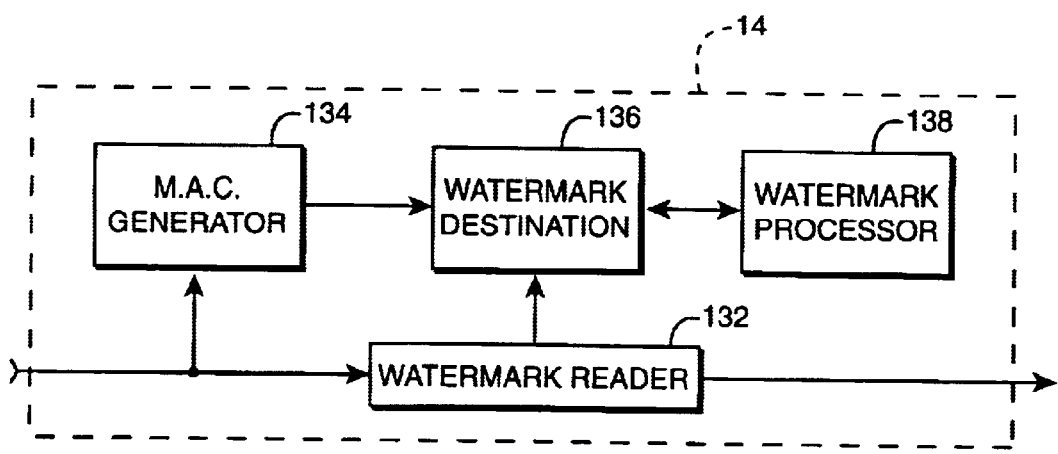
FIG. 3 is a simplified block diagram view showing, in greater detail, a MAC reader at a decoder end.

FIG. 3 shows, in greater detail, the MAC reader unit 14 of FIG. 1. MAC reader unit 14 is located in decoder 18 and includes a watermark reader 132, a second MAC generator unit 134, a watermark destination 136, and, optionally, a watermark processor 138.

Watermark reader 132 is configured to read any embedded watermark etched into the MPEG video stream by watermark unit 130 in MPEG encoder 16 prior to transmission over channel 19. It should be understood that watermark reader 132 is configured in a manner so as to be compatible with the etching strategy used by watermark unit 130. This ensures accurate etching, and recovery of the watermark.

Second MAC generator 134 receives the blocks of image coefficient data from VLD 110 and applies the same predetermined strategy employed by first MAC generator 128 at encoder 16. This generates a MAC digital sequence from the image data in the MPEG video stream, and this MAC digital sequence is transmitted to watermark destination 136.

Watermark destination 136 may be configured to perform a comparison operation between the embedded watermark transmitted to it from watermark reader 132, and the "expected" value derived from the image data by second MAC generator 134. An optional watermark processor 138 may be further provided to examine the embedded watermark from watermark reader 132 and the MAC digital sequence from MAC generator 134. Processor 138 may perform any analysis derived from this comparison. For example, the location of errors in the MAC digital sequence will correspond to particular rows and columns of the MPEG video images. Thus, watermark processor 138 may localize areas to particular coordinates (i.e., a row and a column) and report or store this information. If the embedded watermark matches the MAC digital sequence, then the source of the MPEG video stream can be identified or confirmed by processor 138. If there is no match when one is expected, then processor 138 can determine that the MPEG video stream 104 was tampered with during transmission. It will be appreciated that, in operation, this comparison need not yield an exact match between the watermark reader 132 results and a corresponding second MAC generator 134 results. It is expected that some variation may appear due to, for example, bit errors in channel 19.

It should be understood, however, that variations to FIGS. 1–3 are possible. For example, the first MAC generator 128 and the corresponding second MAC generator 134 may be applied at different locations in the system of FIG. 1.

Figure 4:
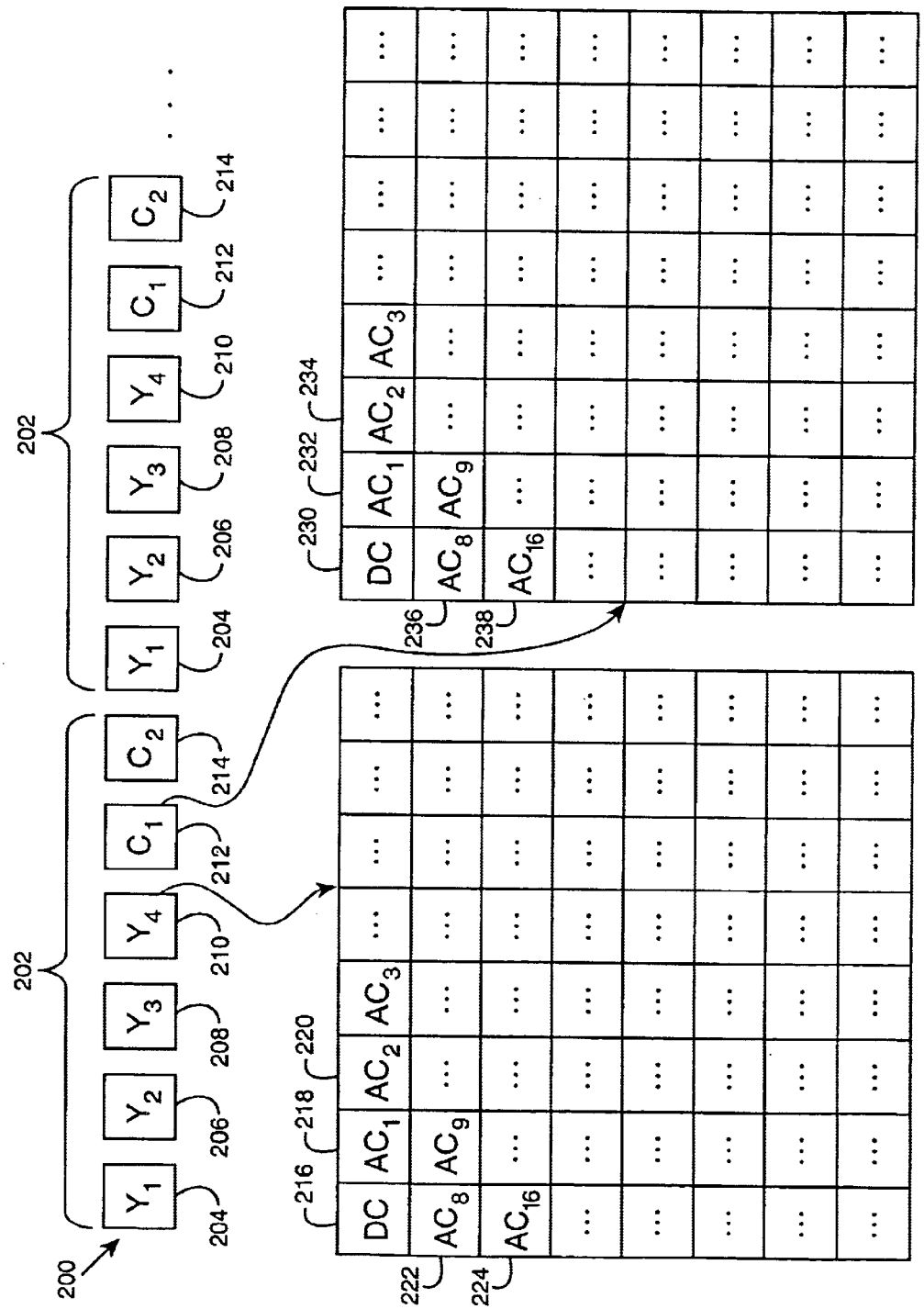
FIG. 4 is a simplified block diagram view of image coefficient data in a Moving Picture Experts Group (MPEG) video stream.

FIG. 4 is a diagram of data structures that may be used in an MPEG video stream. A stream of data 200 leaves the quantizer 34 of the MPEG encoder 16. Each macroblock 202 of an original image has been converted into four luminance or Y blocks 204–210 and two chrominance or C blocks 212–214 (the C blocks are also referred to as $C_b$ block 212 and $C_r$ block 214), which collectively represent a sixteen-by-sixteen pixel block of the original image. The macroblocks are pieced back together by the decoder 18 to form a reconstructed image. It will be appreciated that a complete MPEG stream also includes motion vectors, audio data, and other content interspersed as appropriate among consecutive macroblocks.

Each of the Y blocks 204–210 includes a respective DC coefficient 216 and a plurality of AC coefficients 218–224.

Each of the C blocks is similarly arranged, and contains a respective DC coefficient 230 and a plurality of AC coefficients 232–238. The DC coefficients 216, 230 represent the lowest spatial frequency of the DCT, i.e., a zero-frequency component, while the AC coefficients 218–224, 232–238 represent progressively higher spatial frequency components as one progresses down and to the right in the Y or C blocks 204–214. In general, the lower, right portion of this representation includes many zeros, which are efficiently compressed by variable-length coding.

Figure 5:
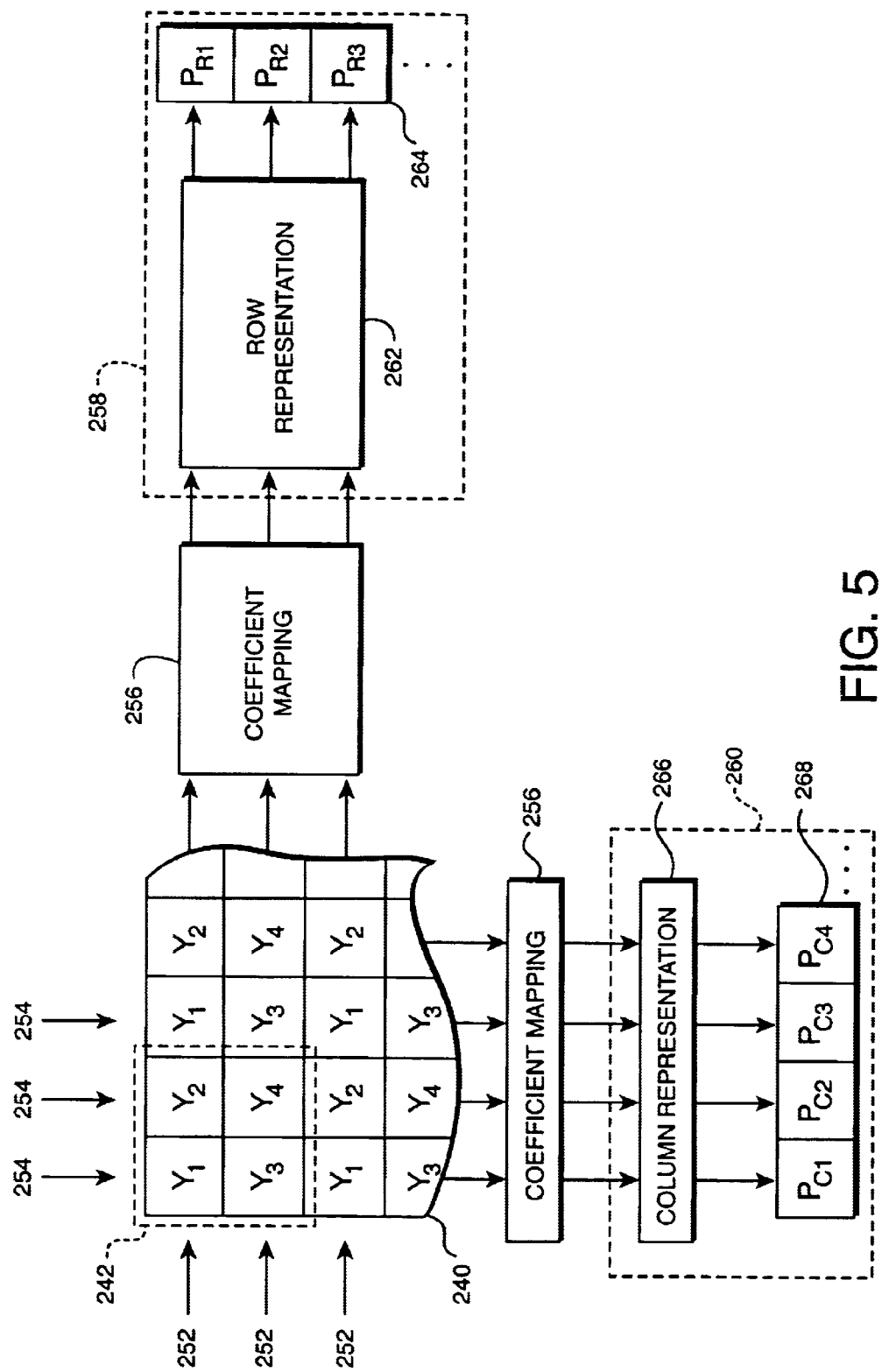
FIG. 5 is a simplified block diagram view showing the relationship between image coefficient data and a parity bits used to form a MAC.

FIG. 5 is a diagrammatic view showing an example of a relationship between digital content in a MPEG format and bits of a message authentication code (MAC) according to the invention. Using the MPEG standard described above, an image 240 is formed from macroblocks 242, each macroblock 242 corresponding to a sixteen-by-sixteen block of image data. Each macroblock 242 includes four luminance blocks 244, 246, 248 and 250, labeled $Y_1$–$Y_4$. Each luminance block including an eight-by-eight matrix of luminance values. These luminance blocks 244–250 contain the same data as the luminance blocks 204–210 of FIG. 4. A preferred embodiment of this invention may not use the chrominance blocks of the MPEG stream to generate a MAC. The luminance blocks 244, 246, 248 and 250 are arranged into rows 252 and columns 254, with each luminance block having a distinct location comprising, a particular row number and a particular column number of image 240. Additional rows and columns (not shown) may be added to describe larger images. One common MPEG format, the main level at main profile, provides for a 720×480 pixel frame at thirty frames-per-second. Each frame of this profile contains a matrix of macroblocks with forty-five columns and thirty rows, or to a matrix of corresponding luminance blocks with ninety columns and sixty rows.

To provide a MAC having a compact representation of image 240, one value is used for each luminance block 244, 246, 248 and 250. In a preferred embodiment, for DCT based video compression schemes, the DC coefficient represents the lowest frequency component and is the most survivable feature of the video sequence. Accordingly, in a preferred embodiment, the DC coefficient of each luminance block is used as a starting point to generate the MAC. In alternate embodiments, low frequency AC coefficients may be employed, to provide an adequately robust MAC to minor distortions, with perhaps less reliability than a MAC derived from DC coefficients.

There are numerous advantages to the use of the MSB of the DC coefficients to produce a MAC, as described herein (e.g., describes content, survivability). A challenge that arises in implementing such an approach, however, is that for any digital word, there are coefficients that may be close in value but that differ in their bit representations in every bit, including the MSB. Thus, minor distortions may change a "127" value to a "128" value, which is a small change, but that changes the most significant bit from a zero to a one. If the MAC generator relies on the MSB, the MAC will change. According to the invention, an error tolerance buffer is provided wherein coefficient mapping occurs to remap the image histogram (e.g., the histogram of the DC coefficients for each row and column) and creates a gap around the MSB crossover threshold.

FIG. 5 shows coefficient mapping blocks 256 to illustrate the relation of the mapping functionality of coefficient mapping unit 126 (FIG. 2) with its input data (video blocks). FIG. 5. further shows functional blocks 258 and 260, which implement any predetermined strategy that use the MSB of the mapped coefficients to develop the digital sequence of bits for the MAC.

In a preferred embodiment, once the DC coefficient for each luminance block has been mapped so that none of the DC coefficients exist in the error tolerance buffer, a row representation is created for each row 252. This is shown as row representation generation block 262. Each row representation, in a preferred embodiment, is the number of DC coefficients (as mapped) that have an MSB equal to one. Next, the row representations are converted to parity bits, designated $P_{R1}$, $PR_2$, $P_{R3}$ ..., in block 264 in FIG. 5. There is one row parity bit for each row of image 240. Likewise, for each column 254 of image 240, a column representation generation block 266 performs a row representation function. In the preferred embodiment, it is the number of DC coefficients in that column having an MSB equal to one. Each column representation is then converted to a respective, single parity bit, designated $P_{C1}$, $P_{C2}$, $P_{C3}$, $P_{C4}$, ... via block 268 of FIG. 5.

In a preferred embodiment, the parity bits $P_{R1}$, $P_{R2}$, $P_{R3}$, etc., from the rows 252 and the parity bits $P_{C1}$, $P_{C2}$, $P_{C3}$, $P_{C4}$, etc., from the columns 254 are then concatenated to form a message authentication code ("MAC") for the image 240. In an MPEG system, the MAC is preferably generated for each I frame of an MPEG video stream, and appended to, or etched into, a next chronological I frame of the MPEG video stream.

For example, the 720×480 pixel image of the MPEG profile mentioned above corresponds to ninety columns and sixty rows of luminance blocks, or a 150 bit MAC. This MAC may be encrypted for further protection using any encryption scheme known in the art. The MAC may additionally include forward error correction or any other error correction code or scheme known in the art, which is particularly useful where a transmission medium does not provide independent error detection and/or correction.

Figure 6A:
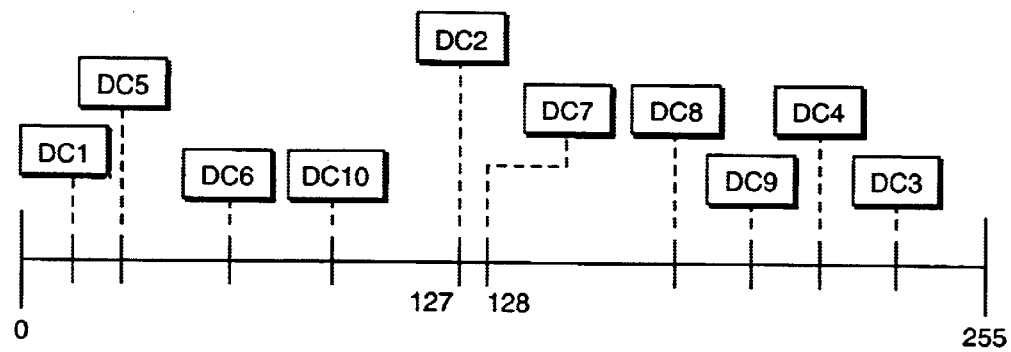
FIGS. 6A–6D are diagrams illustrating an error tolerance buffer according to the present invention.

FIGS. 6A–6D graphically illustrate the inventive error tolerance buffer in accordance with the present invention. FIG. 6A shows a histogram of a portion of the DC coefficients of image 240. For illustration purposes, only ten coefficients are shown, and are designated DC1–DC10. Each coefficient has a respective, original value associated therewith falling within a range of values, shown as a range between 0 and 255 (e.g., an 8-bit binary word). FIG. 6A also shows that DC coefficient DC2 (i.e., bit pattern [0111 1111]) is close in value to DC coefficient DC7 (i.e., bit pattern [1000 0000]), even though their bit representations differ in every bit, particularly in the most significant bit. Minor distortions around the MSB crossover threshold can cause a coefficient to change. Since the first MAC generator 128 uses a MAC generation strategy relying on the most significant bit, it is important to prevent such minor distortions that may occur after encoding from destroying the MAC.

Figure 6B:
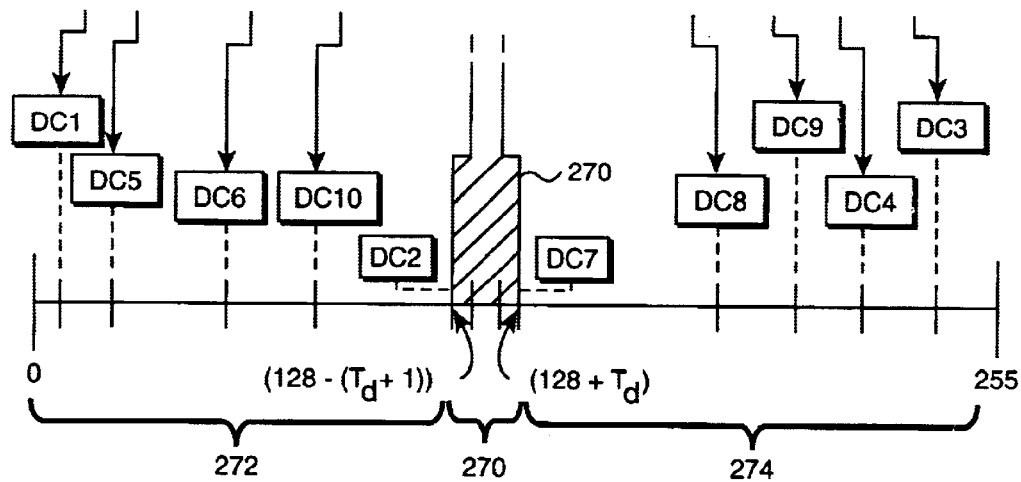

FIG. 6B graphically illustrates an error tolerance buffer 270. FIG. 6B also shows a first region 272, and a second region 274. First and second regions 272 and 274 contain allowed coefficient values, while error tolerance buffer region 270 contains disallowed coefficient values. The region 270 is preferably symmetrically distributed around the crossover in the image histogram (e.g., 128 for an 8-bit word). An acceptable maximum distance parameter $T_d$ is selected, which is indicative of a maximum acceptable change from the original value for a coefficient (as shown in FIG. 6A), to another value due to distortions, tampering, etc. The error tolerance buffer region 270 has a width equal to ($2*T_d+1$). In one embodiment, $T_d$ is equal to two (2), which has been found to provide performance that offers sufficient error tolerance for medium-level compression and only a slight reduction in image quality. First region 272 includes values in the range of 0 to ($128-(T_d+1)$). Second region 274 includes values that range from ($128+T_d$) to 255. Buffer region 270 is therefore ($128-(T_d+1)$) to ($128+T_d$)). The foregoing ranges all assume an 8-bit word, although it should be understood that other bit lengths may be employed. More generally, for an n-bit word, first region 272 ranges between 0 and ($2^n-(T_d+1)$), second region 274 between ($2^n+T^d$) and ($2^{(n+1)}-1$), and the buffer 270 between ($2^n-(T_d+1)$) and ($2^n+T_d$).

The original values of the DC coefficients in FIG. 6A are mapped by coefficient mapping unit 126 to a corresponding modified value included in one of first region 272 and second region 274 but not error tolerance region 270. This is shown graphically by the linkage between FIG. 6A and FIG. 6B. The purpose of the mapping is to move vulnerable coefficients away from the MSB crossover threshold. This allows some distortion to occur without a change in the MSB in any of the coefficients.

In a preferred embodiment, the mapping operation comprises a linear mapping operation where the original values are linearly mapped to the modified values. For example, assume $T_d$ is equal to 2. The first region 272 has a range between 0 and 125. The second region 274 has a range between 130 and 255. The DC coefficients having original values between 0 and 127 (0 and $2^n-1$), are linearly mapped to the values 0 to 125 in the first region. The original value (e.g., 127 for coefficient DC2) may be multiplied by a fraction $125/127$, with the integer portion of the resulting product defining the new, modified coefficient value. Thus, $127*125/127=125$ (new modified coefficient value for DC2). Other linear mapping schemes may be employed. Likewise, in this example, the original DC coefficient values ranging between 128 and 255 ($2^n$ and ($2^{n+1}-1$)), are linearly mapped to the range between 130 and 255.

Figure 6C:
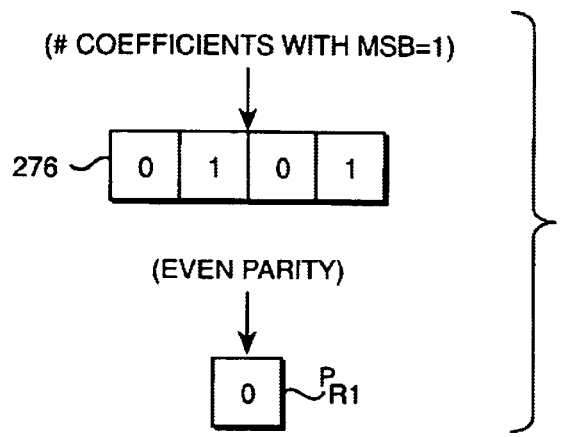

FIG. 6C shows, in greater detail, an approach for generating a row representation that was shown in block form in FIG. 5. Assume that for purposes of illustration, the DC coefficients illustrated in FIG. 6A correspond to those in a first row of luminance blocks of image 240. An approach for generating a row representation involves counting the number of DC coefficients having a most significant bit equal to one. In the illustrated embodiment, there are five DC coefficients satisfying this condition (e.g., DC7, DC8, DC9, DC4 and DC3). The bit-wise row representation 276 may then be used to generate a single bit for that row (e.g., $P_{R1}$), and which forms a part of the MAC. As illustrated in FIG. 6C, such an operation may be a parity operation. For example, to obtain "even" parity, no 1s need be added to the row representation 276 to obtain an "even" number of 1s. Accordingly, the parity bit designated $P_{R1}$ assumes a value of "0". In a like fashion, a parity bit may be generated for every row of image 240 (FIG. 5), and likewise, a parity bit may be generated for each column of image 240.

Each DC coefficient in each luminance block of image 240 is mapped as described above in connection with FIGS. 6A–6B. For purposes of generating a parity bit for a row, however, only the modified (i.e., mapped) DC coefficient values in a particular row will be used by first MAC generator unit 128.

Figure 6D:
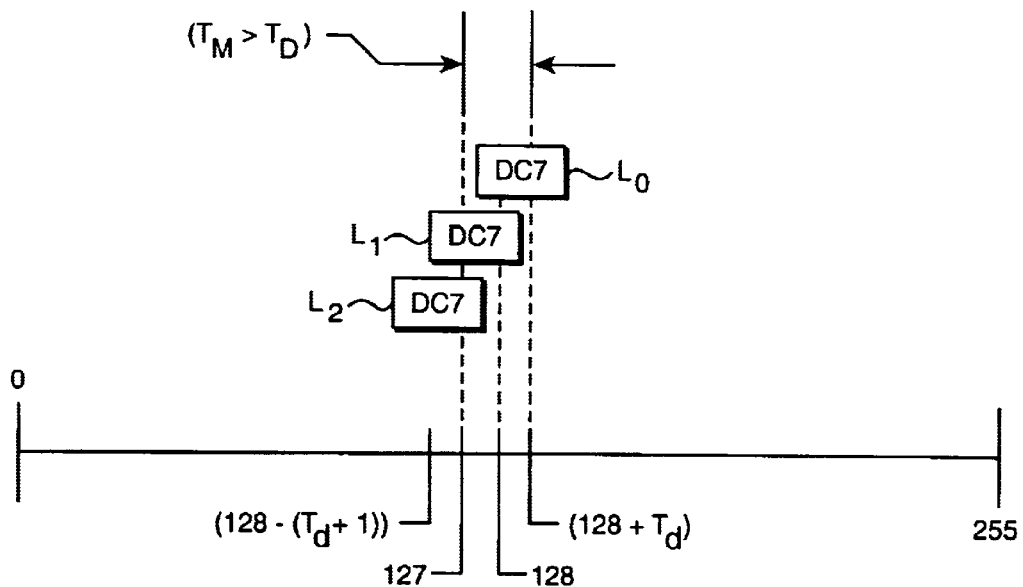

FIG. 6D graphically illustrates the impact and utility of creating error tolerance buffer 270. If changes that occur to the modified DC coefficient values (i.e., as mapped), due to errors, distortions, tampering, etc. is within the "distance" $T_d$, then the MSB of the DC coefficient will remain unchanged. As shown in FIG. 6D, the initial location for the modified DC coefficient (as mapped) DC7 is $L_0$. Recall that DC7 was originally 128, so that a change in value as little as 1 (i.e., 128•127) would change the MSB (i.e., "1" •"0"). An image manipulation may be characterized by a parameter $T_m$, which is a maximum distance between a coefficient corresponding to the original image and the same coefficient corresponding to the manipulated image. If $T_m$ is $<T_d$, then the MAC remains the same. The larger the $T_d$, the more robust the MAC. As shown in FIG. 6D, the coefficient DC7 has moved (decreased) to another position designated $L_1$, which is a move equal to $T_d$. Notwithstanding the change in value equal to $T_d$, the MSB of coefficient DC7 will remain a "1". Note that without the mapping and the error tolerance buffer, such a move would have changed the MSB of DC7 from a "1" to a "0". However, where the move, $T_m$, due to distortions, tampering, etc. is greater than the pre-inserted error tolerance margin corresponding to $T_d$, then the MSB of the DC coefficient will change. As shown in FIG. 6D, the coefficient DC7, in location $L_2$, will have an MSB of "0",which is different from its original MSB of "1". The change in the MSB of coefficient DC7 will change one of the row representations, and one of the column representations, which in turn will also change the corresponding single row parity bit and column parity bit. This change will alter the MAC, which can indicate excessive distortion or tampering. Additionally, this change in the bits will allow a watermark processor, such as processor 138, to localize the area of distortion or tampering.

It bears emphasizing that the mapping of the original values changes the image (i.e., it is not simply a temporary mapping that is done solely for purposes of generating the MAC). The mapping forces a gap in the image histogram. The image is dithered because there are fewer levels available to represent the image. The greater the value of $T_d$, the larger the dithering effect. Thus, there is a trade-off between the quality of the image and the robustness of the MAC. Stated another way, the original image defined by the image coefficient data having the original values has a first image quality associated therewith. The mapped image defined by the image coefficient data having the modified values has a second image quality associated therewith that is less than the first image quality. The step of selecting the parameter $T_d$ includes multiple substeps. First, assessing a difference between the first image quality and the second image quality. This may be accomplished either subjectively, or through some objective assessment as to the difference in image quality as a result of the gap referred to above in the image histogram. Finally, determining whether the difference satisfies predetermined criteria. As described above, in a constructed embodiment, a $T_d$ equal to 2 was found to provide satisfactory performance in that it provided sufficient error tolerance for medium-level compression with only a slight reduction in the image quality.

It will be appreciated that a number of techniques are known for implementing system 10, including portions 12 and 14, described above. All of the functions, except for analog/digital and digital/analog conversion of the video signal, may be accomplished with software executing on a microprocessor in a computer, or on a microcontroller or programmable digital signal processor in an embedded system. The system 10 may be integrated in its entirety into an application-specific integrated circuit, programmable gate array, programmable logic device, or other system-on-a-chip design. Additionally, a number of video processing chips and chip sets are commercially available that are pre-configured to encode and decode MPEG-2 media streams, generally. Any of these devices may be adapted to operate according to the teachings of the invention.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. A method of generating a message authentication code (MAC) associated with an image comprising the steps of:
   receiving a plurality of blocks of image coefficient data, each coefficient having an original value from a range of values;
   defining an error tolerance buffer by dividing said range of values into first and second regions having allowed coefficient values and a buffer region therebetween having disallowed coefficient values;
   mapping an original value of at least one coefficient from each block of image coefficient data to a modified value included in one of said first and second regions;
   generating the MAC according to a predetermined strategy as a function of a respective most significant bit (MSB) of said image coefficient values.

2. The method of claim 1 further including the steps of:
   etching a watermark in said blocks of image coefficient data in accordance with said MAC; and
   transmitting said etched blocks of image coefficient data to a remote receiver.

3. The method of claim 2 further including the steps of:
   receiving said etched blocks of image coefficient data;
   reading said watermark;
   determining said MAC according to said predetermined strategy using said received image coefficient data; and
   comparing said watermark and said produced MAC.

4. The method of claim 1 further including the step of:
   transforming raw image data into said plurality of blocks of image coefficient data according to a Discrete Cosine Transform (DCT) process.

5. The method of claim 1 wherein said plurality of blocks of image coefficient data are arranged in rows and columns corresponding to said image.

6. The method of claim 5 wherein said coefficient values comprise n-bit digital values, said defining step including the substeps of:
   identifying a threshold value within said range of values;
   selecting an acceptable maximum distance parameter $T_d$ indicative of a maximum acceptable change from an original value for a coefficient due to distortions;
   defining said first region as including said modified values between 0 and $(2^n-(T_d+1))$; and,
   defining said second region as including said modified values between $(2^n+T_d)$ and $(2^{(n+1)}-1)$.

7. The method of claim 6 wherein each block of image coefficient data includes a DC coefficient and a plurality of AC coefficients, said mapping step including the substeps of:
   selecting said DC coefficient from each block for mapping;
   linearly mapping said original values of said DC coefficients with MSBs of zero to said modified values included in said first region;
   linearly mapping said original values of said DC coefficients with MSBs of one to said modified values included in said second region.

8. The method of claim 6 wherein each block of image coefficient data includes a DC coefficient and a plurality of AC coefficients, said mapping step including the substeps of:

selecting said DC coefficient for mapping from each block;

linearly mapping said original values of said DC coefficients between 0 and $(2^n-1)$ to said modified values included in said first region; and linearly mapping said original values of said DC coefficients between $2^n$ and $(2^{(n-1)}-1)$ to said modified values included in said second region.

9. The method of claim 8 wherein said MAC generating step includes the substeps of:

generating a respective row representation for each row of said blocks of image coefficient data based on the number of said modified DC coefficient values in the associated row that map into said second region;

generating a respective column representation for each column of said blocks of image coefficient data based on the number of said modified DC coefficient values in the associated column that map into said second region.

10. The method of claim 9 wherein each row representation is a row parity bit and each column representation is a column parity bit.

11. The method of claim 10 wherein said MAC generating step further includes the substep of:

concatenating each of the row parity bits and each of the column parity bits.

12. The method of claim 6 wherein said image defined by said image coefficient data having said original values has a first image quality associated therewith, said image defined by said image coefficient data having said modified values has a second image quality associated therewith that is less than said first image quality, and wherein said step of selecting said parameter $T_d$ includes the substeps of:

assessing a difference between said first image quality and said second image quality; and determining whether said difference satisfies predetermined criteria.

13. A method of generating a message authentication code (MAC) associated with an image comprising the steps of:

receiving a plurality of blocks of image coefficient data including a respective DC coefficient, each coefficient having an original value from a range of values wherein said plurality of blocks are arranged in rows and columns corresponding to said image;

defining an error tolerance buffer by dividing said range of values into first and second regions having allowed coefficient values and a buffer region therebetween having disallowed coefficient values;

linearly mapping said original values of said DC coefficients with most significant bits (MSB) of zero to modified values included in said first region;

linearly mapping said original values of said DC coefficients with MSBs of one to modified values included in said second region;

generating a row representation for each row of said blocks based on the number of said modified values that map into said second region;

generating a column representation for each column of said blocks based on the number of said modified values that map into said second region; and generating a MAC according to a predetermined strategy using said row and column representations.

14. The method of claim 13 further including the steps of:

etching a watermark in said blocks of image coefficient data in accordance with said MAC; and transmitting said etched blocks of image coefficient data to a remote receiver.

15. The method of claim 14 further including the steps of:

receiving said etched blocks of image coefficient data;

reading said watermark;

determining said MAC according to said predetermined strategy using said received image coefficient data; and comparing said watermark and said produced MAC.

16. The method of claim 15 further including the steps of:

determining a difference between said watermark and said produced MAC; and identifying a location of said difference comprising a row identification and a column identification.

17. The method of claim 13 further including the step of:

transforming raw image data into said plurality of blocks of image coefficient data according to a Discrete Cosine Transform (DCT) process.

18. The method of claim 13 further including the step of:

transforming raw image data into said plurality of blocks of image coefficient data according to a block averaging process.

19. The method of claim 13 wherein said DC coefficient values comprise n-bit digital values, said defining step including the substeps of:

identifying a threshold value within said range of values;

selecting an acceptable maximum distance parameter $T_d$ indicative of a maximum acceptable change from an original value for a coefficient due to distortions;

defining said first region as including said modified values between 0 and $(2^n-(T_d-1))$;

defining said second region as including said modified values between $(2^n+T_d)$ and $(2^{(n+1)}-1)$; and defining said error tolerance buffer as having a width of $(2*T_d+1)$.

20. The method of claim 19 wherein each row representation is a row parity bit and each column representation is a column parity bit, and wherein said MAC generating step further includes the substep of:

concatenating each of the row parity bits and each of the column parity bits.

21. A system for generating a message authentication code (MAC) associated with an image comprising:

means for receiving a plurality of blocks of image coefficient data, each coefficient having an original value from a range of values;

means for defining an error tolerance buffer by dividing said range of values into first and second regions having allowed coefficient values and a buffer region therebetween having disallowed coefficient values;

means for mapping an original value of at least one coefficient from each block of image coefficient data to a modified value included in one of said first and second regions; and means for generating a MAC according to a predetermined strategy as a function of a respective most significant bit (MSB) of said modified image coefficient values.

22. The system of claim 21 further including:

means for etching a watermark in said blocks of image coefficient data in accordance with said MAC; and means for transmitting said etched blocks of image coefficient data to a remote receiver.

23. The system of claim 22 further including:
    means for receiving said etched blocks of image coefficient data;
    means for reading said watermark;
    means for determining said MAC according to said predetermined strategy using said received image coefficient data; and
    means for comparing said watermark and said produced MAC.

24. The system of claim 21 further including:
    means for transforming raw image data into said plurality of blocks of image coefficient data according to a Discrete Cosine Transform (DCT) process.

25. The system of claim 21 wherein said plurality of blocks of image coefficient data are arranged in rows and columns corresponding to said image.

26. The system of claim 25 wherein said coefficient values comprise n-bit digital values, said defining means including:
    means for identifying a threshold value within said range of values;
    means for selecting an acceptable maximum distance parameter $T_d$ indicative of a maximum acceptable change from an original value for a coefficient due to distortions;
    means for defining said first region as including said modified values between 0 and $(2^n-(T_d-1))$;
    means for defining said second region as including said modified values between $(2^{n+Td})$ and $(2^{(n+1)}-1)$; and
    means for defining said error tolerance buffer as having a width of $(2*T_d+1)$.

27. The system of claim 26 wherein each block of image coefficient data includes a DC coefficient and a plurality of AC coefficients, said mapping means including:
    means for selecting said DC coefficient from each block for mapping;
    means for linearly mapping said original values of said DC coefficients with MSBs of zero to said modified values included in said first region;
    means for linearly mapping said original values of said DC coefficients with MSBs of one to said modified values included in said second region.

28. The system of claim 26 wherein each block of image coefficient data includes a DC coefficient and a plurality of AC coefficients, said mapping means including:
    means for selecting said DC coefficient for mapping from each block;
    means for linearly mapping said original values of said DC coefficients between 0 and $(2^n-1)$ to said modified values included in said first region; and
    means for linearly mapping said original values of said DC coefficients between $2^n$ and $(2^{(n+1)}-1)$ to said modified values included in said second region.

29. The system of claim 28 wherein said MAC generating means includes:
    means for generating a respective row representation for each row of said blocks of image coefficient data based on the number of said modified DC coefficient values in the associated row that map into said second region;
    means for generating a respective column representation for each column of said blocks of image coefficient data based on the number of said modified DC coefficient values in the associated column that map into said second region.

30. The system of claim 29 wherein each row representation is a row parity bit and each column representation is a column parity bit.

31. The system of claim 30 wherein said MAC generating means further includes:
    means for concatenating each of the row parity bits and each of the column parity bits.

* * * * *